Nov. 4, 1952     E. L. SCHOFIELD     2,616,713
HYDRAULIC LEVELING DEVICE
Filed May 6, 1948     7 Sheets-Sheet 1
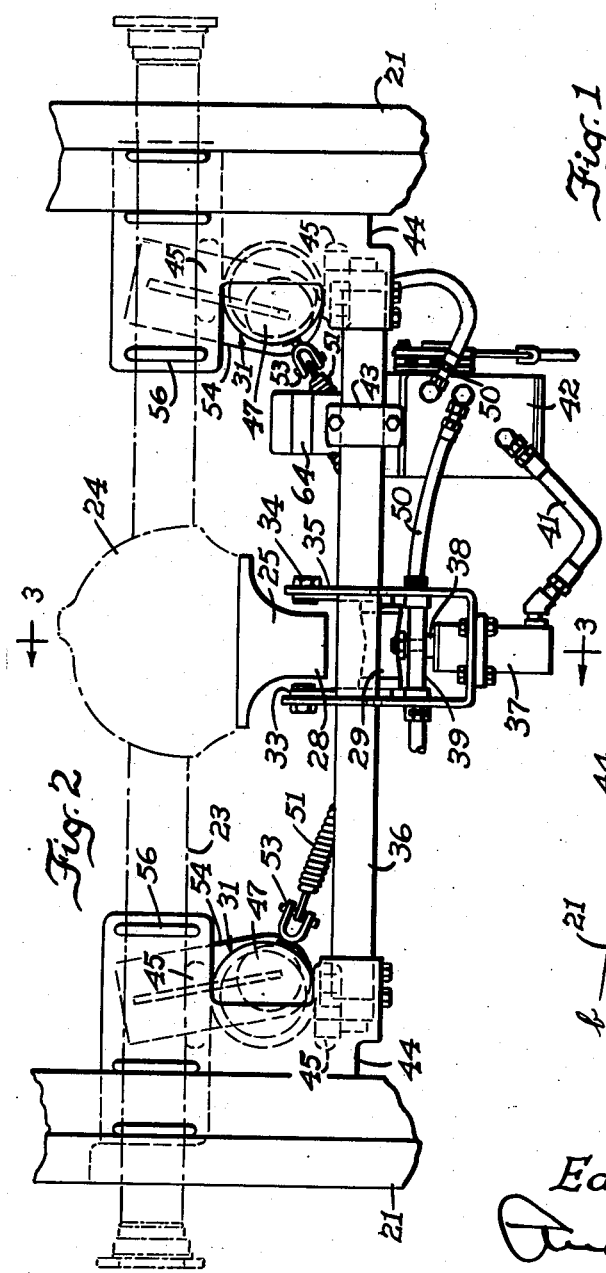
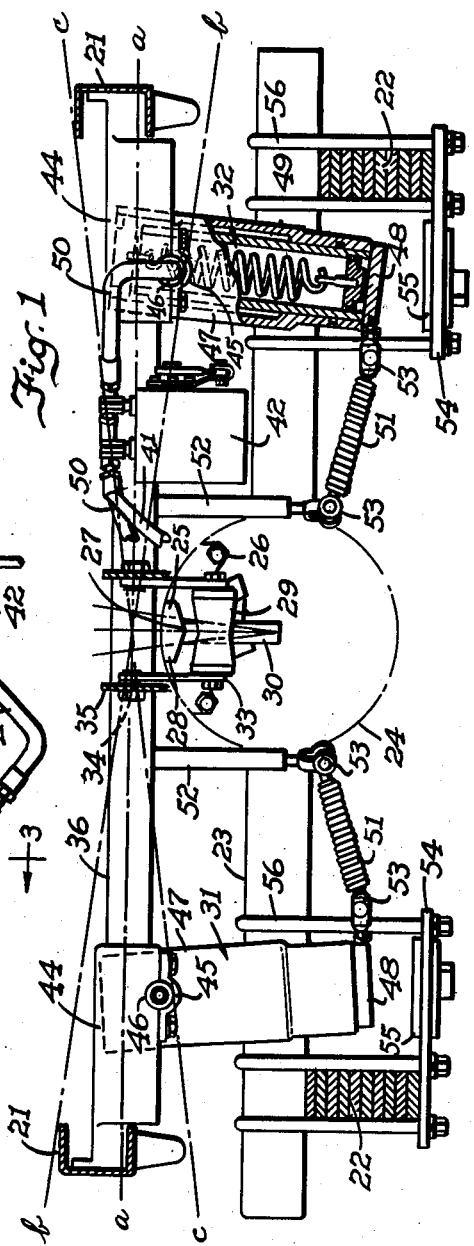
Inventor
Earl L. Schofield Nov. 4, 1952         E. L. SCHOFIELD         2,616,713
HYDRAULIC LEVELING DEVICE
Filed May 6, 1948         7 Sheets-Sheet 2

Inventor
Earl L. Schofield
Andrew F. Wintercorn
Atty

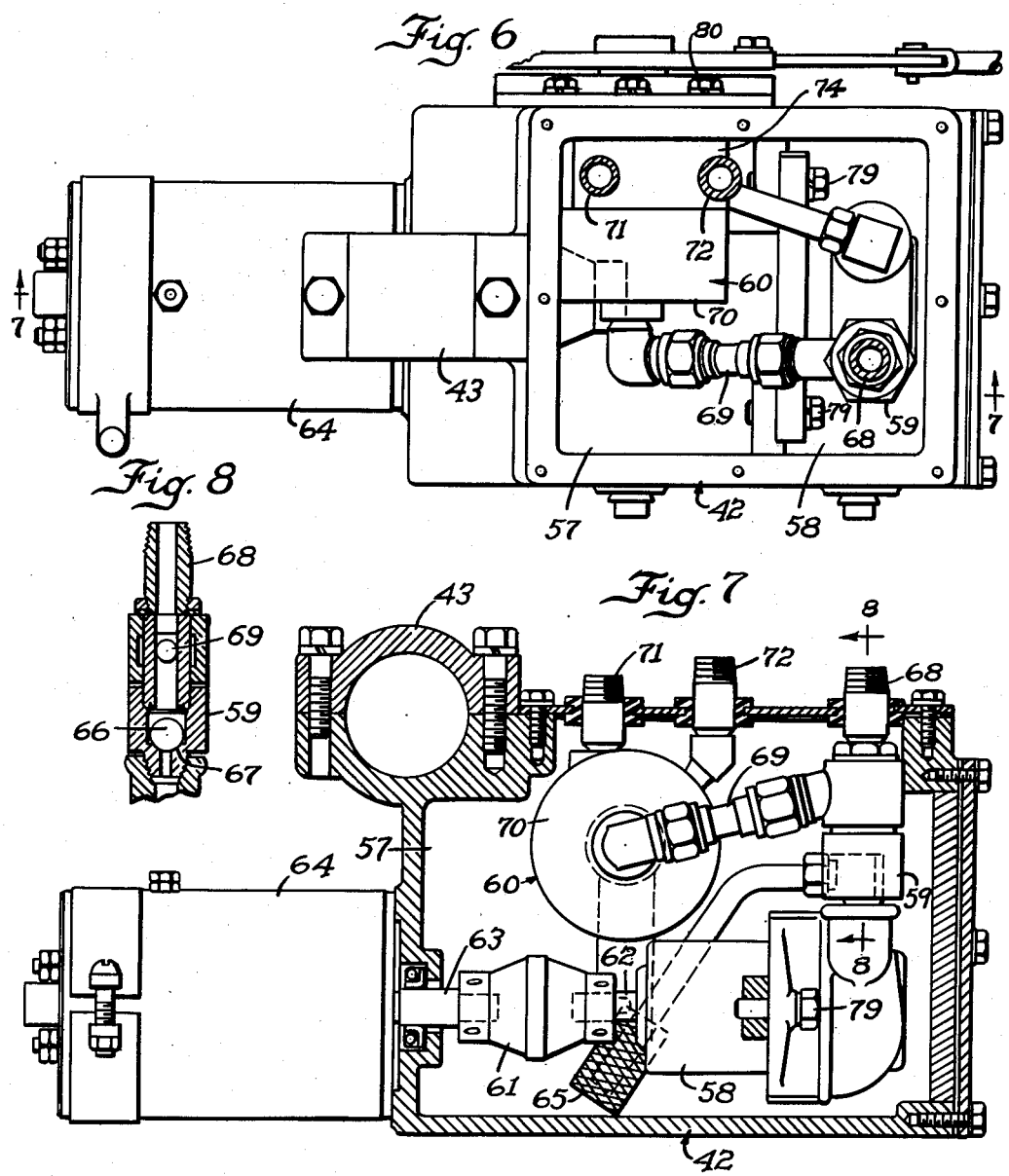

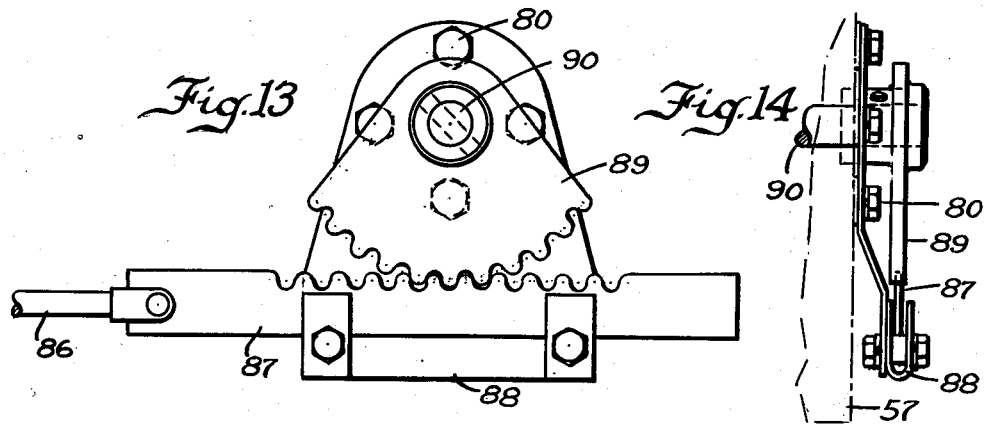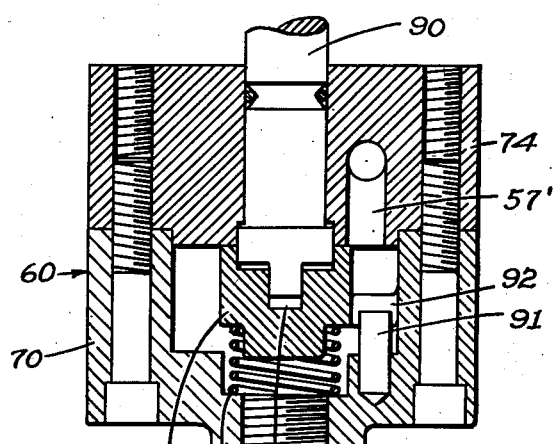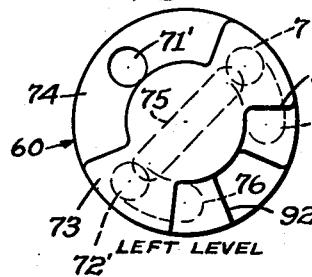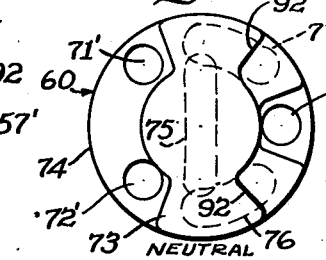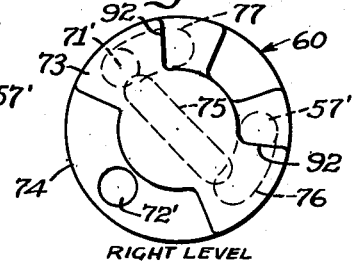

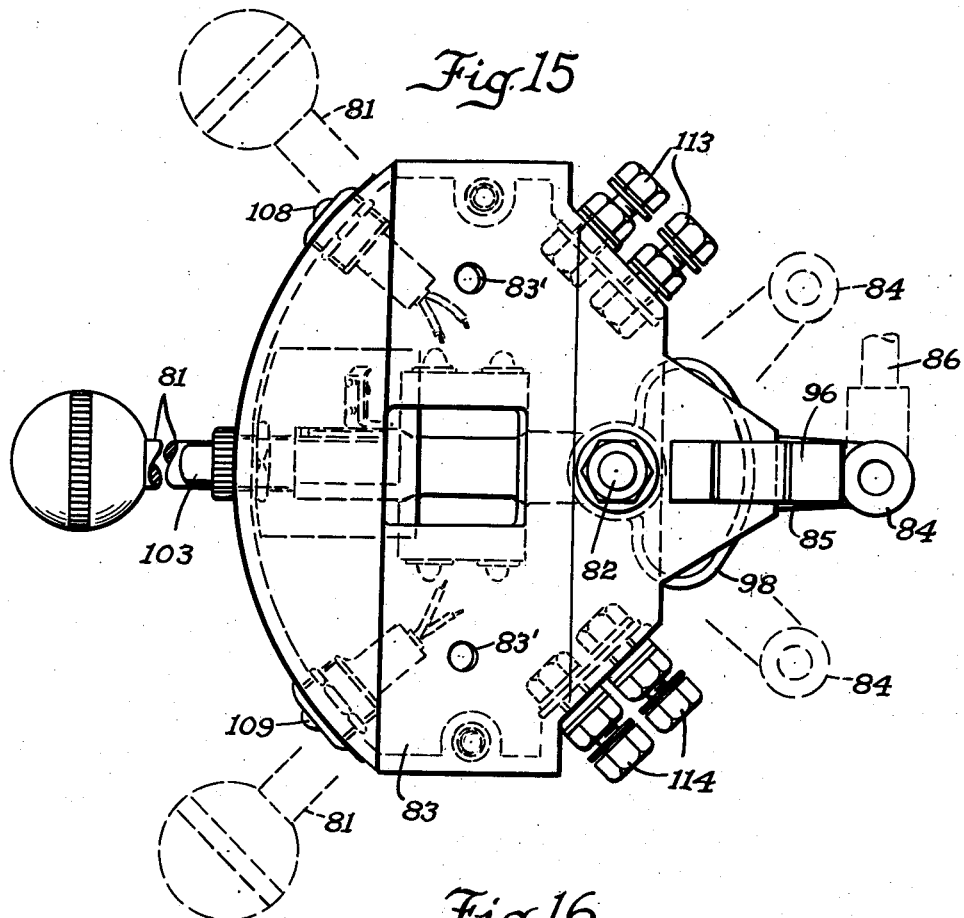
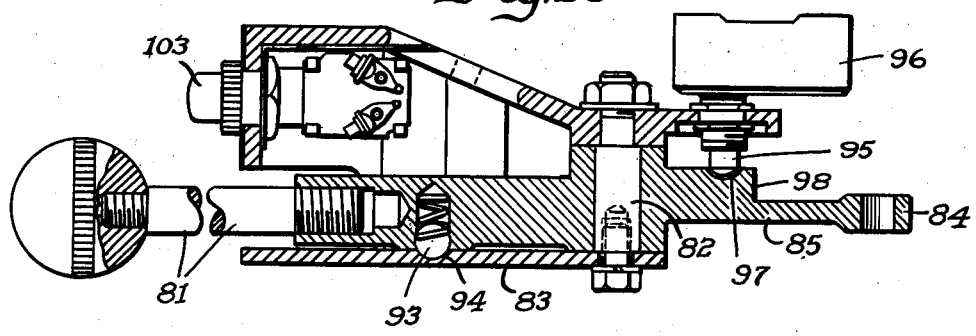

Nov. 4, 1952        E. L. SCHOFIELD        2,616,713
HYDRAULIC LEVELING DEVICE
Filed May 6, 1948        7 Sheets-Sheet 6
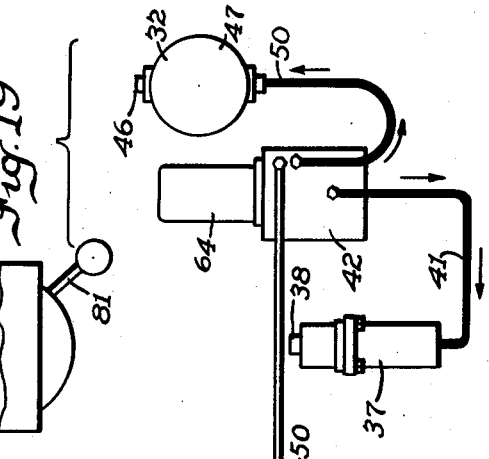
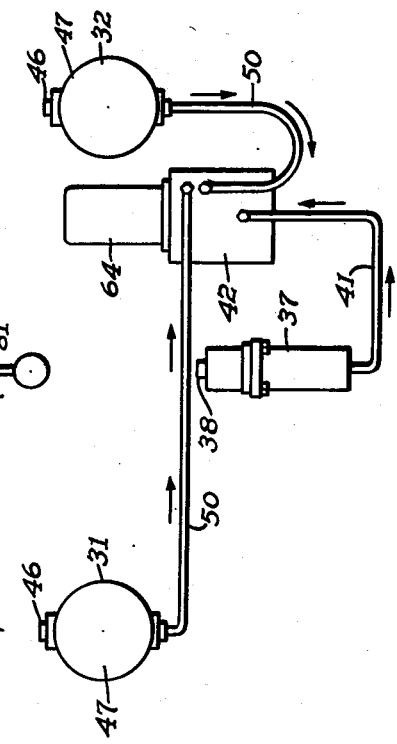
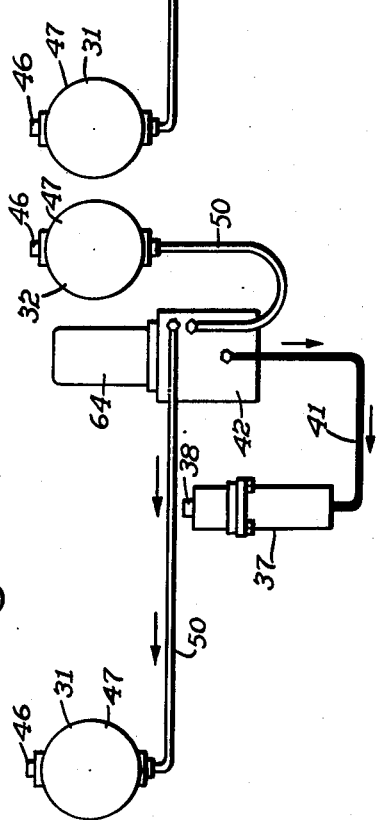
Inventor
Earl L. Schofield
Andrew F. Wintercorn
Atty

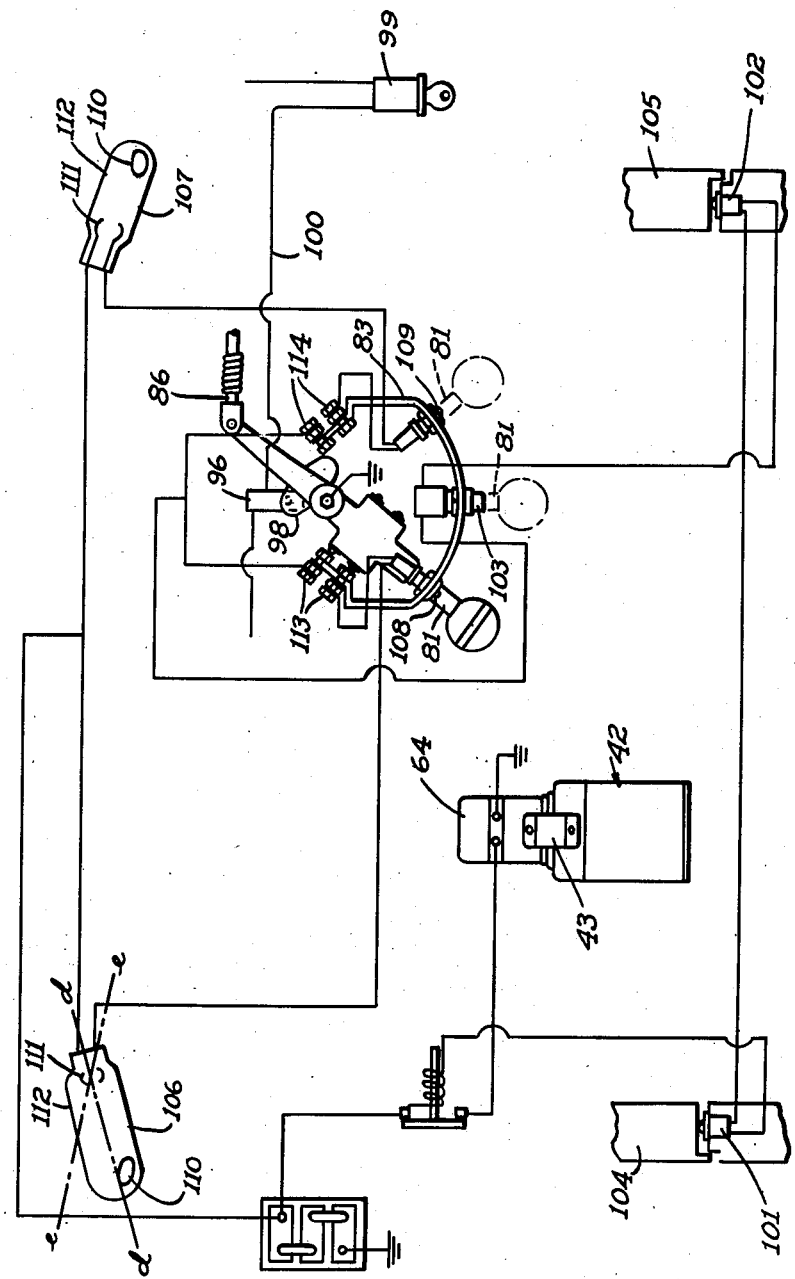

Patented Nov. 4, 1952

2,616,713

UNITED STATES PATENT OFFICE 2,616,713

HYDRAULIC LEVELING DEVICE

Earl L. Schofield, Rockford, Ill., assignor to E. L. Schofield, Incorporated, Rockford, Ill., a corporation of Delaware Application May 6, 1948, Serial No. 25,407

34 Claims. (Cl. 280—6)

1

This invention relates to hydraulic leveling devices for motor vehicles, and, although specially designed for use in connection with side service hearses, to enable proper operation of the casket table in loading and unloading the casket, despite lower vehicle design and the use of lower pressure tires, it will soon appear that that is only one of the many uses for which the invention is adapted; other uses, for example, being on taxicabs, automobiles generally, and, broadly stated, any and all vehicles having spring suspensions.

The principal object of my invention is to provide a completely self-contained leveling unit at the rear of the chassis frame directly in front of the axle, which may be removed from, or attached to, the chassis without disturbing any of the regular chassis components, the present unit involving the use of a strong but comparatively lightweight tubular cross-member that is adapted to be fastened securely to the chassis frame, which carries the unit and assumes all of the stresses and strains incident to the operation of the leveling unit.

Most prior leveling mechanisms were subject to the serious objection that they involved permanent connection with the rear axle, and, consequently, had to assume all of the wear and tear of continuous driving. In accordance with my invention, the leveling mechanism is entirely divorced from the axle so long as the vehicle is in motion. In the leveling unit of my invention, a hook-shaped bracket is mounted on the front upper portion of the differential housing, relative to which a hanger carrying a pivot roller is oscillatably mounted on a support on the aforesaid tubular cross-member and swingable in either direction under pressure of a hydraulically actuated piston working in a cylinder carried on the same support with the hanger, whereby to provide a detachable center pivotal connection between the chassis frame and the rear axle housing, so that either side of the chassis frame may be raised relative to the axle with a single direct action hydraulic jack. This is in contrast to prior and much more complicated leveling mechanisms, where to accomplish the differential leveling, in which one side is raised and the other side lowered, double acting opposed cylinders were employed to depress one side of the chassis and raise the other through intermediate links and levers. In the leveling unit of my invention, two hydraulically operable jacks are suspended from the opposite ends of the aforesaid tubular cross-member and are arranged to be operated separately, either jack when operated being arranged for

2 direct action engagement with a pad provided therefor on the vehicle spring to elevate that side of the chassis and, by virtue of the center fulcrum or pivot, proportionately depress the other side. The hydraulic cylinder associated with the center pivot hanger is so connected in the hydraulic system with whichever hydraulic jack is being operated that there is continuous pressure exerted against the hanger, to insure maintaining a positive pivotal connection between the chassis frame and the rear axle throughout the leveling operation.

Other important features of the leveling mechanism of my invention are the following:

(1) The pistons of the two hydraulic jacks and the piston for operating the hanger carrying the center pivot all incorporate tension springs for returning the same to retracted position as soon as the manually operated valve which directs the oil under pressure to the hanger cylinder and the cylinder of whichever jack is to be operated is shifted back to neutral position, the oil being then returned by spring pressure on the pistons back to the sump;

(2) A check valve in the oil discharge passage of the motor driven pump serves to hold the jack positively in extended position, and also the pivot hanger operating piston, until the manual control valve is shifted back to neutral position;

(3) A manual control lever is pivotally mounted on a segmental support attached suitably onto the instrument panel of the vehicle to be levelled and is operatively connected to the aforesaid control valve to shift it to either of two extreme positions for right or left hand levelling, there being an electrically connected switch in the ignition circuit for the engine of the vehicle that is spring-pressed toward closed circuit position and arranged to be held against spring pressure in open circuit position by said lever when it is in levelling position, whereby to permit running the engine and driving the vehicle only so long as the lever is in neutral position and the levelling mechanism is accordingly rendered inoperative, thereby insuring having the chassis returned to normal position after a levelling operation has been performed, before the engine can be started;

(4) The vehicle doors have switches operated thereby to closed circuit position when the doors are closed, and these switches are connected in series in the electrical circuit with the manually operable push button switch that controls the motor driving the oil pump furnishing the oil under pressure to operate either of the levelling jacks and the pivot hanger, whereby to prevent levelling the vehicle when either of the doors is open;

(5) Mercury switches connected in electrical circuits with signal light bulbs on the segmental support for the manual control lever each serve to complete a circuit through its associated bulb when the vehicle is levelled, thereby informing the operator when to release the push button and allow the pump drive motor to stop;

(6) The power unit for the levelling mechanism is self-contained and includes in the one housing the main control valve, the pump, and the check valve, the housing carrying on the outside the electric motor for driving the pump suitably coupled through an opening in the housing wall directly with the pump, and the housing serving as a sump and reservoir for reserve oil, to which oil is returned from the jack cylinders and pivot hanger cylinder after each levelling operation and from which the pump draws oil through a strainer and delivers it under pressure to the aforesaid cylinders past the aforesaid check valve, and (7) The jack cylinders are oscillatably suspended from the tubular cross member, and the piston in each of said cylinders has a closely coiled spring connected thereto at one end and at the other end to a depending arm on the crossmember to serve as a positive push or spacer member to line up the piston with the pad on the spring with which it is supposed to engage in a levelling operation, and yet permit such extension or elongation as is necessary when the piston is extended in levelling the vehicle, thereby accommodating the levelling mechanism to the movement of the chassis frame relative to the axle.

The invention is illustrated in the accompanying drawings, in which—

Fig. 1 is a front view of the hydraulic levelling mechanism of my invention, indicating in connection therewith enough of the chassis frame and the rear axle housing and spring suspension to enable a clear understanding of the operation of said mechanism;

Fig. 2 is a plan view of Fig. 1;

Fig. 6 is a plan view of the power unit;

Fig. 7 is a longitudinal section on line 7—7 of Fig. 6;

Fig. 8 is a sectional detail on line 8—8 of Fig. 7;

Fig. 9 is a central section through the manual control valve;

Figs. 10, 11 and 12 are diagrams of the control valve in its three different positions;

Figs. 13 and 14 are two views taken at right angles to one another of the remotely controlled means for operating said control valve;

Figs. 15 and 16 are a plan view and longitudinal section, respectively, of the manual control lever and its segmental support;

Figs. 17, 18 and 19 are hydraulic circuit diagrams, showing the direction of flow of the operating fluid in "neutral," left-hand levelling, and right-hand levelling, respectively, as indicated by the corresponding position of the control lever which is also illustrated in each figure, and Fig. 20 is an electrical wiring diagram.

The same reference numerals are applied to corresponding parts throughout the views.

Figure 3:
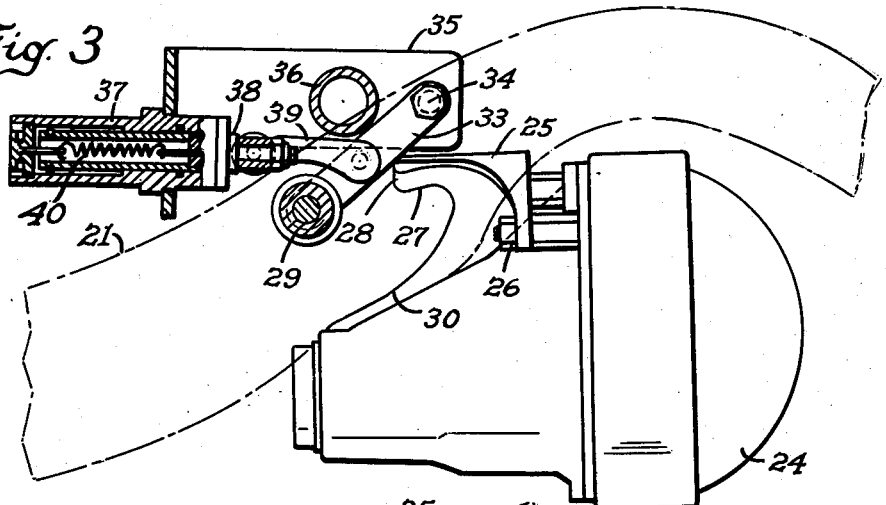
Fig. 3 is a section on line 3—3 of Fig. 2 to show the differential bracket and showing the center pivot roller in retracted position relative to it.
Figure 4:
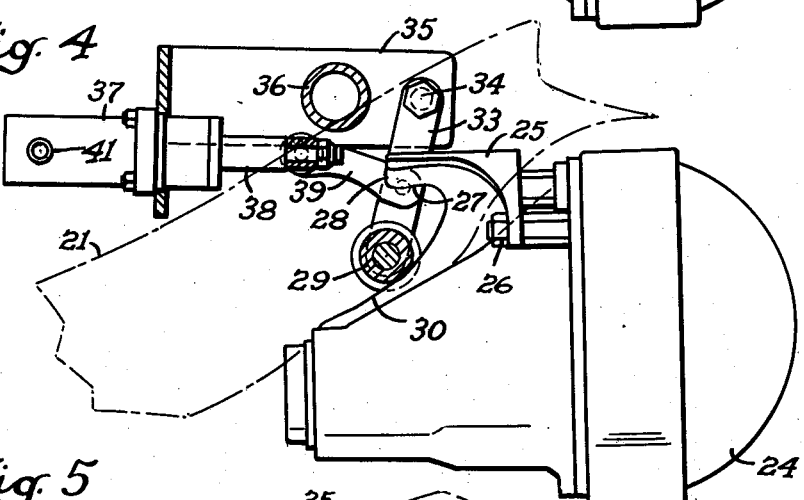
Figs. 4 and 5 are sections like Fig. 3 but showing the center pivot roller in two other positions, the latter being that in which the frame is pivotally connected at the middle of the rear end to the differential housing for the levelling operation.
Figure 5:
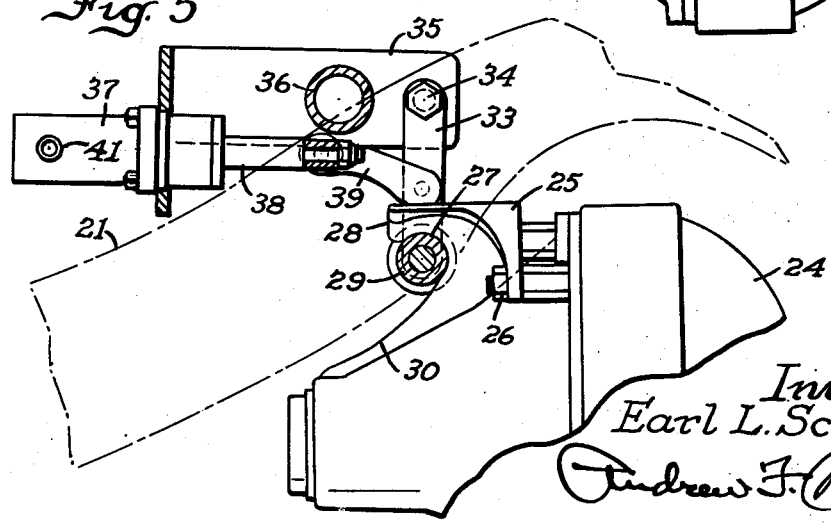

Referring first to Figs. 1–5, the reference numeral 21 designates the chassis frame of a vehicle having a suitable spring suspension 22 connecting it at the rear in the usual way with the rear axle housing 23. The differential housing 24, which forms the middle portion of the rear axle housing is arranged to be detachably connected to the frame 21 by a sort of hook and eye means and has a bracket 25 which forms the hook element bolted to the front upper portion thereof, as indicated at 26, to provide a fulcrum at 27 on the underside of its hook-shaped forwardly reaching portion 28. A roller 29, which is a part of the eye element and is hereafter referred to as the "center pivot," is only generally cylindrical, the same being of gradually increasing diameter from the middle toward its opposite ends. The roller 29 therefore resists sidewise sliding movement relative to the fulcrum 27 when engaging the latter pivotally or tiltably to connect the frame 21, at the middle of the rear end thereof, with the differential housing 24, in preparation for levelling of the vehicle. The center pivot 29, being a roller, is adapted to roll as shown in Fig. 1, with minimum frictional resistance along the upwardly and rearwardly extending track surface 30 provided on the lower portion of the bracket, leading to the fulcrum 27, whereby said center pivot is guided positively toward engagement with the fulcrum. With this combination I am assured of positive connection between the frame and axle with the center pivot regardless of differences in loading of the vehicle. The frame 21, as will be noticed, has to be elevated to the small extent indicated in Fig. 5 by the action of the levelling jack 31 or 32 before the center pivot 29 can come into the final operative engagement with the fulcrum 27 shown in Fig. 5, the further operation of the levelling jack thereafter causing the frame 21 to be tilted relative to the rear axle housing 23 from the normal axis $a$—$a$, indicated in Fig. 1, parallel to the rear axle housing, one way or the other, depending upon whether it is right or left hand levelling. Jack 31 serves for right hand levelling toward the inclined axis $b$—$b$, shown in Fig. 1, and jack 32 for left hand levelling toward the other inclined axis $c$—$c$ shown in the same view. The center pivot 29 is carried on a hanger 33 pivotally mounted at 34 on the side of a U-shaped frame 35 welded or otherwise suitably secured to a tubular cross-member 36 which forms a unitary support for the levelling unit. The frame 35 has a hydraulic cylinder 37 carried on the crossportion of the frame 35 in which a piston 38 is reciprocable, the piston being operatively connected, as indicated at 39, with the hanger 33. The piston 38 is normally urged by a coiled tension spring 40 toward retracted position so as to hold the center pivot 29 disengaged from and in spaced relation to the bracket 25, as shown in Fig. 3, the piston being movable in the opposite direction against the action of said spring by the admission of oil or other operating fluid under pressure through the flexible conduit 41 from the power unit 42. This unit 42 is supported on the cross-member 36 by means of a clamp or hanger 43, and the cross-member, in turn, is supported in and secured to brackets 44, designed to fit into the channels of the side members of the frame 21 and be suitably secured thereto, as indicated in Fig. 1. These brackets have spaced bearings 45 to receive trunnions 46 provided on the upper ends of the cylinders 47 of jacks 31 and 32 for suspension thereof. The hollow pistons or rams 48 of the two jacks are normally held in retracted position by tension springs 49 and are operable in the other direction by the admission of oil or other operating fluid under pressure through flexible conduits 50 which communicate with the cylinders 47 through passages in the trunnions 46. A closely coiled tension spring 51 is provided in connection with each jack to serve as a positive action link in one direction of operation for holding it in the correct position for operation in spaced relation to a depending arm 52 provided on the crossmember 36, the spring having universal joint connections at its opposite ends with the jack piston 48 and arm 52, as indicated at 53. The jacks 31 and 32 are in this way lined up properly with their associated pads 54 provided on the springs 22, but the springs 51 are otherwise yieldable and adapted to be stretched when the jacks are extended in the levelling operations. Rubber cushions 55 are provided on top of the plates forming the pads 54 both to silence the levelling jacking operation and prevent slippage. The pads 54 are fastened to the vehicle springs and rear axle housing by U-bolts 56. The jacks 31 and 32 exert direct lifting forces between the vehicle chassis frame 21 and the rear axle housing 23, the one jack or the other being, of course, operated separately accordingly as right or left hand levelling is needed. The trunnions 46, of course, provide for the necessary pivotal movement between the frame 21 and the cylinder of the operated jack in the lifting and lowering of the frame relative to the axle. The cylinder 37, as will soon appear, has fluid delivered to it under pressure throughout the levelling operation with either jack, so that there will be no danger of the center pivot 29 becoming accidentally disconnected at any phase of the levelling operation, the roller 29 being continuously pressed firmly into cooperative relationship with the fulcrum portion 27 of the bracket 25. The crossmember 36, with its mounting brackets 44, forms the support for the whole levelling mechanism so that it can be attached to or removed from a chassis without disturbing any of the regular chassis components. Its addition to the chassis really adds considerable strength and rigidity, and nearly all of the stresses and strains of operation of the levelling mechanism are absorbed by it. However, what is most important is the fact that the center pivot 29, when disconnected from the bracket 25, completely divorces the levelling mechanism from the rear axle housing, so that running this vehicle on the road cannot possibly subject the levelling mechanism to needless wear and tear. Most prior levelling mechanisms involved permanent link and lever connections between the axle and frame, and hence more wear was directly attributable to driving than to levelling. The designers of other prior levelling mechanisms, which were intended to avoid that objection, invariably ran into almost as serious difficulties in attempting to solve the problem of providing workable detachable connections of a practical form between the axle and frame during levelling. With the single center pivot 29 of such simple design I have obtained the desired results without any serious practical objections. Furthermore my improved construction can be produced at much lower cost than prior constructions that have appeared on the market.

Referring now to Figs. 6–12, the power unit 42 comprises a housing 57 in which are contained the pump 58, check valve 59, control valve 60, and coupling 61 for flexibly connecting the driven shaft 62 of the pump with the armature shaft 63 of the electric motor 64. The housing 57 forms the atmospheric reservoir or sump for the oil or other working fluid delivered by the pump 58 under pressure through check valve 59 to the center pivot actuating cylinder 37 and either of the two jack cylinders 47. Pump 58 is operated by motor 64 only during levelling. The oil or other fluid used is drawn by pump 58 from the bottom of the housing 57 through strainer 65 and forces the ball 66 in check valve 59 off its seat 67 and is delivered through nipple 68 to the conduit 41 extending to the center pivot cylinder 37, oil being at the same time delivered through the branch pipe connection 69 to the bonnet 70 of the control valve for delivery through either of the other two nipples 71 and 72 and thence through conduit 50 to the left hand or right hand jack cylinder 47, depending upon the position of the rotor 73 relative to stator 74. Stator 74 has ports 71' and 72' which communicate with nipples 71 and 72, respectively, and has a third port 57' which drains to the sump 57. Rotor 73 has a diametrically extending passage 75 interconnecting diametrically opposed elongated ports 76 and 77 which are arranged to bring into communication the drain port 57' and either of the jack cylinder ports 71' and 72', as shown in Figs. 10 and 12, whereby to leave open to entrance of fluid under pressure from branch 69 the other of said two jack cylinder ports, as port 71' in Fig. 10 for left hand levelling, and port 72' in Fig. 12 for right hand levelling. When the rotor 73 is shifted to neutral position, as in Figs. 11 and 17, both jack cylinder ports 71' and 72' are open to the sump through open port 57' for free return of oil from whichever jack cylinder 47 has just been operated and also from the center pivot cylinder 27, the latter being, of course, in communication with bonnet 70 through branch connection 69. Springs 40 and 49 tend to return the pistons and the oil is accordingly forced back to the sump 57. So long as the rotor 73, which it will be noticed in Fig. 9 is held seated on stator 74 under pressure of coiled compression spring 78, as well as being held seated during a levelling operation under pressure of the oil or other working fluid, is left in its position for right or left hand levelling, the oil in the pressure lines to the two cylinders actuated remains trapped by reason of seating of the ball 66 on seat 67, long after the pump 58 has stopped. The pump 58 is of any suitable or preferred type and preferably includes a pressure relief valve (not shown) which, in event of any electrical trouble, by reason of which the operator is not promptly signalled when the levelling jack has been operated far enough, will open so as to bypass oil so long as the motor 64 is allowed to operate over-time, thereby avoiding placing too much strain upon any of the working parts and running the motor unnecessarily at heavy overload. The motor 64 is fastened rigidly to the side of the housing 57 in the position shown in Fig. 7, and the pump 58 is fastened, as at 79, to the inside walls of the housing, and the same is true of valve 60, as shown at 80. The unit 42 is, therefore, self-contained, and is supported, as previously stated, on hanger 43. Should any need ever arise for removing the power unit 42 for inspection or repair, it can obviously be done easily. The open sump system just described avoids any danger of the pump or any of the oil lines becoming air-bound. The strainer 65 keeps dirt out of the system, thereby further assuring freedom from trouble in the operation of the levelling apparatus.

The control valve 60 is operated by remote control from the driver's seat. Referring to Figs. 13–16, a manual control lever 81 is pivotally mounted, as at 82, on a segmental-shaped support 83 that is attached suitably at holes 83' in the top wall to the instrument panel of the hearse or other vehicle to be levelled. The eye 84 provided on the end of the oscillating arm portion 85 of control lever 81 is connected by means of a flexible cable 86 with a rack 87 that is slidably guided in a bracket 88 fastened onto the out-side of the housing 57 of the power unit 42, preferably by the same bolts 80 used for fastening the control valve 60 to the inside wall of said housing. The usual flexible conduit or casing for the cable 86 is not shown but such equipment for remote control purposes is believed to be too well known to require illustration and description. The rack 87 meshes with a gear segment 89 pinned, or otherwise suitably secured, to the outer end of the stem 90 of the control valve 60, which, as shown in Fig. 9, is operatively connected to the rotor 73 to turn it from the neutral position of Fig. 11 either way, for left hand leveling, as in Fig. 10, or right hand leveling, as in Fig. 12. A stop pin 91 in the bonnet 70 radially aligned with the drain port 57' cooperates with radial shoulders 92 on the rotor 73 to limit the turning of the rotor in either direction from the neutral position. A spring pressed ball detent 93 on the control lever 81 engages in a recess 94 provided therefor in the support 83, to locate the lever 81 and rotor 73 in the neutral position, the operator being aware when he hears the click of the ball dropping into the recess when the lever has been moved to the neutral position. A spring pressed plunger 95 for operating a switch 96 mounted on the support 83 is also arranged to ride into a recess 97, closing the contacts in the switch 96 when the lever 81 is in neutral position, this recess 97 being provided in the middle of a segmental-shaped portion 98 provided on the lever. The switch 96 is connected in series with the ignition switch 99 for the engine of the hearse or other vehicle to be leveled, as indicated at 100 in Fig. 20, so that when the lever 81 is swung to the right or left for right hand or left hand leveling, respectively, switch 96 is opened and it is, therefore, impossible to run the engine and drive the vehicle. It is only when the leveling mechanism is disconnected from the running gear of the vehicle, and the control lever 81 is in neutral position, that the vehicle can be driven.

There are, in addition, two vehicle door operated switches 101 and 102, as disclosed in Fig. 20, which are closed only when the doors are closed, and these switches are connected in series in the electrical circuit with the manually operated push button switch 103 that is mounted on the support 83 and controls the motor 64 of the power unit 42, whereby to prevent operation of the leveling mechanism when either of the side service doors 104 and 105 on a side delivery hearse, for example, is opened, thus making the operation fool-proof.

Two mercury switches 106 and 107 are also indicated in Fig. 20 as connected in series in electrical circuits with signal lights 108 and 109, respectively, provided on the support 83 for the manual control lever 81. Globules of mercury are indicated at 110 in the switches 106 and 107 normally in spaced relation to terminals 111, due to the normal inclination of the bulbs 112 forming the bodies of these switches. The lever 81 is shown in Fig. 20 as moved to the left for left hand leveling, and when the vehicle body reaches a leveled position, the switch 106, which was previously inclined on the axis d—d, has reversed its inclination to the axis e—e and the mercury 110 accordingly closes the electrical circuit through terminals 111 and the signal light 108 is accordingly lighted. The operator, in other words, after having moved the lever 81 to the right or left hand leveling position, depresses the push button 103 and keeps it depressed until he sees the signal light 108 or 109, as the case may be, go on, and then he releases the button, stopping the motor 64 and leaving the vehicle in its leveled position for whatever length of time that may be desired. To return the vehicle to its normal condition, the operator merely shifts the control lever 81 back to neutral position.

There are insulated ground contacts 113 and 114 on opposite sides of the support 83 for grounding the lever 81 in either of its two extreme positions and completing the circuit for the push button switch 103, so as to permit operation of the motor 64 only when the lever 81 has been moved all the way to the left hand extreme or right hand extreme, for left or right hand leveling, as the case may be, thereby again positively assuring fool-proof operation by making certain that the control valve 60 has been shifted correctly before the motor 64 is thrown into operation to start the leveling operation.

It is believed the foregoing description conveys a good understanding of the objects and advantages of my invention. The appended claims have been drawn to cover all legitimate modifications and adaptations.

I claim:

1. The combination with the axle and the spring supported frame of a vehicle, of a levelling mechanism for the frame including a jack at each side portion of said frame workable between the axle and frame, means operable to connect the vertically aligned middle portions of said frame and axle detachably and pivotally for lateral tilting of the frame relative to the axle about the longitudinal center-line of the frame, and means operable to actuate either of said jacks whereby to raise one side of said frame and by virtue of said connection between said frame and said axle lower the other side of said frame relative to said axle.

2. The combination with the differential housing portion at the middle of a vehicle's rear axle housing, and the spring supported frame of the vehicle of a levelling mechanism for the frame including a jack at each side portion of said frame workable between said axle and frame, means operable to connect said differential housing and the vertically aligned middle portion of said frame detachably and pivotally for lateral tilting of the frame relative to the axle about the longitudinal center-line of the frame, and means operable to actuate either of said jacks selectively whereby to raise one side of said frame and to lower the other side relative to said axle.

3. The combination with the axle and the spring supported frame of a vehicle, of a levelling mechanism for the frame including a jack at one side portion of said frame, workable between the axle and frame, means operable to connect the vertically aligned middle portions of said frame and axle detachably and pivotally for lateral tilting of the frame relative to the axle about the longitudinal center-line of the frame, and means operable to actuate said jack whereby to raise one side of said frame and by virtue of said connection between said frame and said axle lower the other side of said frame relative to said axle.

4. The combination with the differential housing portion at the middle of a vehicle's rear axle housing, and the spring supported frame of the vehicle, of a levelling mechanism for the frame including a jack at one side portion of said frame workable between said axle and frame, means operable to connect said differential housing and the vertically aligned middle portion of said frame detachably and pivotally for lateral tilting of the frame relative to the axle about the longitudinal center-line of the frame, and means operable to actuate said jack whereby to raise one side of said frame and to lower the other side relative to said axle.

5. The combination with the axle and the spring supported frame of a vehicle, of a levelling mechanism for the frame including a fluid pressure operable jack at each side portion of said frame workable between said axle and frame, fluid pressure operable connecting means for detachably tiltably interconnecting said frame and axle substantially in the vertical plane of the longitudinal center line of said frame, a source of pressure fluid, and manually operable control valve means for delivering pressure fluid from said source to said last mentioned means and to either of said jacks selectively.

6. The combination with the axle and the spring supported frame of a vehicle, of a levelling mechanism for the frame including a fluid pressure operable jack at one side portion of said frame workable between said axle and frame, fluid pressure operable connecting means for detachably tiltably interconnecting said frame and axle substantially in the vertical plane of the longitudinal center line of said frame, a source of pressure fluid, and manually operable control valve means for delivering pressure fluid from said source to said last mentioned means and to said jack.

7. The combination set forth in claim 5 wherein the fluid pressure operable means for detachably tiltably interconnecting said frame and axle has a predetermined lost motion in a vertical direction so that the frame is raised a predetermined extent by the operation of either jack before the tiltable interengagement of the frame and axle occurs.

8. The combination set forth in claim 6 wherein the fluid pressure operable means for detachably tiltably interconnecting said frame and axle has a predetermined lost motion in a vertical direction so that the frame is raised a predetermined extent by the operation of said jack before the tiltable interengagement of the frame and axle occurs.

9. The combination with the differential housing portion at the middle of a vehicle's rear axle housing, and the spring supported frame of the vehicle, of a levelling mechanism for the frame including a jack at each side portion of said frame workable between said axle and frame, hook and eye elements, one of the said hook and eye elements being fixed on the differential housing, the other of said hook and eye elements being movably mounted on the vertically aligned middle portion of said frame for detachable engagement with the first of said hook and eye elements to connect the frame and axle detachably and pivotally for lateral tilting of the frame relative to the axle about the longitudinal center-line of the frame, and means operable to actuate either of said jacks selectively whereby to raise one side of said frame and to lower the other side relative to said axle.

10. The combination with the differential housing portion at the middle of a vehicle's rear axle housing, and the spring supported frame of the vehicle, of a levelling mechanism for the frame including a jack at one side portion of said frame workable between said axle and frame, hook and eye elements, one of said hook and eye elements being fixed on the differential housing, the other of said hook and eye elements being movably mounted on the vertically aligned middle portion of said frame for detachable engagement with the first of said hook and eye elements to connect the frame and axle detachably and pivotally for lateral tilting of the frame relative to the axle about the longitudinal center-line of the frame, and means operable to actuate said jack whereby to raise one side of said frame and to lower the other side relative to said axle.

11. The combination with the axle and the spring supported frame of a vehicle, of a levelling mechanism for the frame including a jack at each side portion of said frame workable between the axle and frame, each jack comprising interfitting piston and cylinder elements with spring means normally urging the same to return to retracted relationship, fluid pressure operable connecting means for detachably tiltably interconnecting said frame and axle substantially in the vertical plane of the longitudinal center line of said frame, said connecting means including interfitting piston and cylinder elements with spring means normally urging the same to retracted relationship, a source of hydraulic fluid under pressure, a sump, and manually operable control valve means for connecting said last named cylinder and either of the jack cylinders with said pressure fluid source or with said sump.

12. The combination with the axle and the spring supported frame of a vehicle, of a levelling mechanism for the frame including a jack at one side portion of said frame workable between the axle and frame, said jack comprising interfitting piston and cylinder elements with spring means normally urging the same to return to retracted relationship, fluid pressure operable connecting means for detachably tiltably interconnecting said frame and axle substantially in the vertical plane of the longitudinal center line of said frame, said connecting means including interfitting piston and cylinder elements with spring means normally urging the same to retracted relationship, a source of hydraulic fluid under pressure, a sump, and manually operable control valve means for connecting said last named cylinder and the jack cylinder with said pressure fluid source or with said sump.

13. In a levelling mechanism for the spring supported frame of a vehicle, the vehicle having an axle, means for detachably pivotally connecting said frame and axle for lateral tilting of said frame relative to said axle substantially on the longitudinal center line of said frame, said means comprising hook and eye elements, one of said elements being fixed on the axle, the other element being movably mounted on said frame for movement toward and away from the first of said elements.

14. In a levelling mechanism for the spring supported frame of a vehicle, the vehicle having an axle, means for detachably pivotally connecting said frame and axle for lateral tilting of said frame relative to said axle substantially on the longitudinal center line of said frame, said means comprising hook and eye elements, the hook element being fixed on the axle, the eye element being oscillatably mounted on said frame for movement toward and away from the hook element.

15. In a levelling mechanism for the spring supported frame of a vehicle, the vehicle having an axle, means for detachably pivotally connecting said frame and axle for lateral tilting of said frame relative to said axle substantially on the longitudinal center line of said frame, said means comprising hook and eye elements, the hook element being fixed on the axle, the eye element being oscillatably mounted on said frame for movement toward and away from the hook element, said eye element including a roller to rollingly engage on the lower portion of said hook element, said hook element having an upwardly inclined lower guide portion the upper portion of which terminates in the hooked portion on the under side of which said roller is arranged to teeter to tiltably connect said frame and axle.

16. In a levelling mechanism for the spring supported frame of a vehicle, the vehicle having an axle, means for detachably pivotally connecting said frame and axle for lateral tilting of said frame relative to said axle substantially on the longitudinal center line of said frame, said means comprising hook and eye elements, the hook elements being fixed on the axle, the eye element being oscillatably mounted on said frame for movement toward and away from the hook element, said eye element including a roller to rollingly engage on the lower portion of said hook element, said hook element having an upwardly inclined lower guide portion the upper portion of which terminates in the hooked portion on the under side of which said roller is arranged to teeter to tiltably connect said frame and axle, the roller being generally cylindrical in form at the middle but enlarged toward opposite ends.

17. In a levelling mechanism for the spring supported frame of a vehicle, the vehicle having an axle, detachably interengageable elements on the frame and axle disposed substantially in the vertical plane of the longitudinal center line of the frame and adapted when interengaged to connect said frame and axle for lateral tilting of said frame relative to said axle, and fluid pressure operable means connected to at least one of said inter-engageable elements to cause interengagement of said elements and hold the same so engaged.

18. In a levelling mechanism for the spring supported frame of a vehicle, the vehicle having an axle, means for detachably pivotally connecting said frame and axle for lateral tilting of said frame relative to said axle substantially on the longitudinal center line of said frame, said means comprising hook and eye elements, one of said elements being fixed on the axle, the other element being movably mounted on said frame for movement toward and away from the first of said elements, and fluid pressure operable means on said frame connected to said movable element to move it toward operative position and hold it in such position.

19. The combination with the axle and the spring supported frame of a vehicle, of a cross-member fixed at its opposite ends to said frame in a substantially parallel relation to said axle, vehicle levelling jacks carried on opposite ends of said cross-member and arranged to engage abutments in fixed relation to the ends of said axle, a pivot member carried on the middle portion of said cross-member detachably engageable under a fulcrum on the middle portion of said axle, whereby said frame is tiltable laterally relative to said axle about the longitudinal center line of said frame, means operable to interengage said pivot member and fulcrum detachably, and means operable to actuate either of said jacks, whereby to raise one side of said frame and lower the other.

20. The combination with the axle and the spring supported frame of a vehicle, of a cross-member fixed at its opposite ends to said frame in substantially parallel relation to said axle, a vehicle levelling jack carried on one end of said cross-member and arranged to engage an abutment in fixed relation to the adjoining end of said axle, a pivot member carried on the middle portion of said cross-member detachably engageable under a fulcrum on the middle portion of said axle, whereby said frame is tiltable laterally relative to said axle about the longitudinal center line of said frame, means operable to interengage said pivot member and fulcrum detachably, and means operable to actuate said jack, whereby to raise one side of said frame and lower the other.

21. Vehicle levelling apparatus as set forth in claim 19 wherein each jack includes a fluid operable piston and cylinder movable outwardly relative to one another against a return spring, and wherein the means operable to interengage said pivot member and fulcrum includes a fluid operable piston and cylinder movable outwardly relative to one another against a return spring, the other means of said apparatus including a reservoir for a liquid medium, a power operated pump for delivering the liquid under pressure from said reservoir to said last mentioned cylinder and to either of said first mentioned cylinders, a check valve between the pump and said cylinders to prevent return flow through the pump, and a selector valve communicating with said pump and reservoir and manually operable to direct the liquid flow to one or the other of the first mentioned cylinders or connect all of said cylinders to said reservoir for return of the liquid under action of the return springs.

22. Vehicle levelling apparatus as set forth in claim 20 wherein said jack includes a fluid operable piston and cylinder movable outwardly relative to one another against a return spring, and wherein the means operable to interengage said pivot member and fulcrum includes a fluid operable piston and cylinder movable outwardly relative to one another against a return spring, the other means of said apparatus including a reservoir for a liquid medium, a power operated pump for delivering the liquid under pressure from said reservoir to said cylinders, a check valve between the pump and said cylinders to prevent return flow through the pump, and a valve communicating with said pump and reservoir and manually operable to direct the liquid flow to said cylinders or connect said cylinders to said reservoir for return of the liquid under action of the return springs.

23. Vehicle levelling apparatus as set forth in claim 19 wherein each jack includes a fluid operable piston and cylinder movable outwardly relative to one another against a return spring, and wherein the means operable to interengage said pivot member and fulcrum includes a fluid operable piston and cylinder movable outwardly relative to one another against a return spring, the other means of said apparatus including a reservoir for a liquid medium, a power operated pump for delivering the liquid under pressure from said reservoir to said last mentioned cylinder and to either of said first mentioned cylinders, a check valve between the pump and said cylinders to prevent return flow through the pump, and a selector valve communicating with said pump and reservoir and manually operable to direct the liquid flow to one or the other of the first mentioned cylinders or connect all of said cylinders to said reservoir for return of the liquid under action of the return springs, said reservoir being detachably mounted on said cross-member and having flexible conduits extending therefrom to said cylinders to conduct the liquid to and fro therebetween, the pump and valve being housed in said reservoir, and the pump and valve having the conduits connected thereto, said other means aforesaid including an electric motor for driving said pump fixed to said reservoir and drivingly connected with said pump, and remote control means for said valve and motor.

24. Vehicle levelling apparatus as set forth in claim 20 wherein said jack includes a fluid operable piston and cylinder movable outwardly relative to one another against a return spring, and wherein the means operable to interengage said pivot member and fulcrum includes a fluid operable piston and cylinder movable outwardly relative to one another against a return spring, the other means of said apparatus including a reservoir for a liquid medium, a power operated pump for delivering the liquid under pressure from said reservoir to said cylinders, a check valve between the pump and said cylinders to prevent return flow through the pump, and a valve communicating with said pump and reservoir and manually operable to direct the liquid flow to said cylinders or connect said cylinders to said reservoir for return of the liquid under action of the return springs, said reservoir being detachably mounted on said cross-member and having flexible conduits extending therefrom to said cylinders to conduct the liquid to and fro therebetween, the pump and valve being housed in said reservoir, and the pump and valve having the conduits connected thereto, said other means aforesaid including an electric motor for driving said pump fixed to said reservoir and drivingly connected with said pump, and remote control means for said valve and motor.

25. Vehicle levelling apparatus as set forth in claim 20 wherein said jack is pivotally suspended on said cross-member and said apparatus includes a guide post extending downwardly from said cross-member in inwardly spaced relation to said jack, and a guide link pivotally connecting the lower ends of said post and jack comprising a closely coiled tension spring which while its coils are closed acts as a spacer link holding the lower end of said jack in operative relationship to said abutment until the jack commences to lift the frame after which said spring is stretched with further extension of said jack.

26. The combination with the axle and the spring supported frame of a vehicle, of a levelling mechanism for the frame including a jack at one side portion of said frame workable between the axle and frame, means operable to connect the vertically aligned middle portions of said frame and axle detachably and pivotally, said jack being pivotally suspended from said frame and arranged to engage an abutment in fixed relation to said axle, and a guide link pivotally connected at one end to said frame and at its other end to the lower portion of said jack, said link comprising a closely coiled tension spring which while its coils are closed acts as a spacer link holding the lower end of said jack in operative relationship to said abutment until the jack commences to lift the frame after which said spring is stretched with further extension of said jack.

27. A vehicle levelling unit comprising an elongated support member constructed for attachment at its ends to the opposite sides of a vehicle frame, jacks for lifting the frame relative to the vehicle axle mounted on the ends of said support, a hanger oscillatably mounted upon the middle portion of said support member for detachable pivotal connection under a projection on the middle of the axle, means on said support member operable to swing said hanger toward operative position, and means operable to actuate either of said jacks.

28. A unit as set forth in claim 27, wherein the jacks comprise fluid operable piston and cylinder devices, and wherein the means operable to swing said hanger comprises a fluid operable piston and cylinder device, the means operable to actuate either of said jacks including a source of pressure fluid supply, and valve means for connecting the hanger cylinder and either of said jack cylinders jointly with the source of pressure fluid supply.

29. A unit as set forth in claim 27, wherein the jacks comprise fluid operable piston and cylinder devices, and wherein the means operable to swing said hanger comprises a fluid operable piston and cylinder device, the means operable to actuate either of said jacks including a source of pressure fluid supply, and valve means for connecting the hanger cylinder and either of said jack cylinders jointly with the source of pressure fluid supply, the pressure fluid being liquid, the source of pressure fluid supply including a reservoir, and the unit including a pump for pumping the liquid from the reservoir into the piston and cylinder devices, and the piston and cylinder devices including return springs, whereby the liquid is returned to the reservoir when the valve means is returned to a neutral position.

30. A vehicle leveling unit as set forth in claim 27, wherein the jacks are pivotally suspended on said support and the unit includes posts extending downwardly from said support in inwardly spaced relation to said jacks, and guide links pivotally connecting the lower ends of said posts and jacks, each link comprising a closely coiled tension spring which while its coils are closed acts as a spacer link holding the lower end of said jack in an operative relationship to an abutment on the vehicle in rigid relationship to the axle until the jack commences to lift the frame relative to the axle, after which said spring is stretched in the further extension of said jack.

31. A vehicle leveling unit comprising an elongated support member constructed for attachment at its ends to the opposite sides of a vehicle frame, a jack for lifting the frame relative to the vehicle axle mounted on one end of said support, a hanger movably supported on the middle portion of said support for detachable pivotal connection with the middle portion of the axle, means operable to move the hanger toward operative position, and means operable to actuate the jack.

32. A unit as set forth in claim 31, wherein the jack comprises a fluid operable piston and cylinder device, and wherein the means operable to move the hanger to operative position comprises a fluid operable piston and cylinder device, the means operable to actuate the jack including a source of pressure fluid supply, and valve means for connecting the hanger cylinder and jack cylinder jointly with the source of pressure fluid supply.

33. A unit as set forth in claim 31, wherein the jack comprises a fluid operable piston and cylinder device, and wherein the means operable to move the hanger to operative position comprises a fluid operable piston and cylinder device, the means operable to actuate the jack including a source of pressure fluid supply, and valve means for connecting the hanger cylinder and jack cylinder jointly with the source of pressure fluid supply, the pressure fluid being liquid, the source of pressure fluid supply including a reservoir, and the unit including a pump for pumping the liquid from the reservoir into the piston and cylinder devices, and the piston and cylinder devices including return springs, whereby the liquid is returned to the reservoir when the valve means is returned to a neutral position.

34. A vehicle leveling unit as set forth in claim 31, wherein the jack is pivotally suspended on said support and the unit includes a post extending downwardly from said support in inwardly spaced relation to said jack, and a guide link pivotally connecting the lower ends of said post and jack, comprising a closely coiled tension spring which while its coils are closed acts as a spacer link holding the lower end of said jack in an operative relationship to an abutment on the vehicle in rigid relationship to the axle until the jack commences to lift the frame relative to the axle, after which said spring is stretched in the further extension of said jack.

EARL L. SCHOFIELD.

REFERENCES CITED

The following references are of record in the file of this patent:

UNITED STATES PATENTS

| Number | Name | Date |
| --- | --- | --- |
| 919,854 | Gross et al. | Apr. 27, 1909 |
| 987,660 | Wood | Mar. 21, 1911 |
| 1,461,894 | Deucher | July 17, 1923 |
| 1,990,798 | Richter et al. | Feb. 12, 1935 |
| 2,365,387 | Briscoe | Dec. 19, 1944 |
| 2,406,803 | Barnhart | May 21, 1946 |